United States Patent Office 3,733,362
Patented May 15, 1973

3,733,362
VAPOR PHASE CARBONYLATION
Giovanni Biale, Placentia, Calif., assignor to Union Oil
Company of California, Los Angeles, Calif.
No Drawing. Filed Mar. 19, 1968, Ser. No. 714,348
Int. Cl. C07c 45/08
U.S. Cl. 260—604 HF                                8 Claims

ABSTRACT OF THE DISCLOSURE

A gas phase carbonylation reaction is provided wherein a gas mixture of a low molecular weight olefin, carbon monoxide, and a coreactant such as an alcohol, amine, water or hydrogen is contacted in the vapor phase with a heterogeneous catalyst comprising a Group VIII metal and a biphyllic ligand which is supported in the reaction zone on a suitable inert solid support such as silica or alumina. In a typical application, propylene is hydroformylated to butyraldehyde by the contacting of a gas mixture of propylene, carbon monoxide and hydrogen with a tris (triphenylphosphine)rhodiumhydridecarbonyl catalyst impregnated on silica pellets. The reaction is performed at 400 p.s.i.g. and about 280° F. to produce an excellent yield of butyraldehyde having a high normal to iso ratio.

DESCRIPTION OF THE INVENTION

The invention relates to the heterogeneous catalysis of the gas phase carbonylation of olefins and in particular relates to carbonylation of olefins to produce carbonyl products such as aldehydes, acids, esters or amides. In a particular embodiment, the invention relates to the hydroformylation of hydrocarbon olefins to aldehydes having one more carbon than the olefin.

Carbonylation reactions which involve the addition of carbon monoxide and a coreactant to the unsaturate carbons of olefinically unsaturated hydrocarbons have, heretofore, been practiced primarily in liquid phase. These reactions are typically performed in liquid phase with homogeneous catalysts to achieve a high rate of reaction and selectivity. The preoccupation with homogeneous catalysis has in general dissuaded the application of the reaction to vapor phase processing with a heterogeneous catalyst. In addition, the high pressures employed in the typical hydroformylation reactions have precluded consideration of vapor phase reactions.

The liquid phase homogeneous catalysis, however, has a number of disadvantages. One difficulty is encountered in removal of the products from the reaction system and the catalyst and purification of the reaction product from residual or trace amounts of the catalyst used in the processing. Because the catalyst as commonly used in a soluble, homogeneous catalyst, the separation of the catalyst from the reaction product is frequently performed in the product recovery step and the additional handling of the catalyst often results in its decomposition.

It is an object of this invention to provide a vapor phase heterogeneous catalysis of a carbonylation reaction.

It is a further object of this invention to provide a vapor phase reaction which can be catalyzed by stable, heterogeneous catalysts.

It is an object of this invention to provide a vapor phase processing which is generally applicable to carbonylation reactions using a variety of coreactants.

It is a specific object of this invention to provide a carbonylation process for the carbonylation of hydrocarbon olefins with a rhodium-biphyllic ligand containing catalyst.

Other and related objects will be apparent from the following description of the invention.

I have now found that carbonylation reactions can be performed in the gas phase using a heterogeneous catalyst. The catalyst employed can be a Group VIII metal, carbonyl, hydride or salt that is stabilized with a biphyllic ligand to maintain an active catalyst for the heterogeneous catalysis. Preferably, the catalyst is distended or supported on a suitable inert solid support such as silica or alumina. The reactants comprising the olefin, carbon monoxide and a coreactant selected from the class of alcohols, water, hydrogen and amines are passed into contact with the heterogeneous catalyst at *a space velocity* from 500 to about 10,000 total gas volumes per catalyst volume per hour at a temperature from 30° to 300° C. and a pressure from 1 to 1000 atmospheres. The relative ratios of the carbon monoxide to hydrogen can be from 1:10 to about 10:1 with from 5 to 50 percent of the vapor composition comprising the reactant olefin. If desired an inert diluent gas comprising from 0 to 90 percent of the reactant gas mixture, preferably from 15 to 50 percent thereof, can be introduced to moderate the reaction.

Surprisingly, I have observed a high rate of reaction in the vapor phase catalysis and an unusually high yield of the normal or straight chain aldehyde. Conversions of up to 74 percent based on ethylene converted at space velocities of 2000–4000 total gas volumes per volume per hour have been observed. With higher molecular weight olefins, a high yield of the normal carbonyl products have also been observed, e.g., yields of normal butyraldehyde up to seventeen times that of the branched chain isomer have been obtained during hydroformylation of propylene. The hydrogenation of the reactant olefin—an undesired side reaction that is experienced in liquid phase homogeneous catalysis—is significantly reduced in the heterogeneous vapor phase processing and the favorable high yields of straight chain product are achieved without experiencing any significant hydrogenation.

Olefins which can be carbonylated to carbonyl products in general comprise ethylenically unsaturated, acyclic or alicyclic hydrocarbon olefins having from about 2 to about 6 carbons, e.g., ethylene, propylene, butene-1, isobutene, pentene - 1, pentene-2, 3 - methylbutene-1, cyclopentene, hexene-1, hexene-2, methylcyclopentene, cyclohexene, 3,4 - dimethylbutene - 1, etc. Preferably the reactant olfin is a low molecular weight alpha olefin such as the aforementioned alpha olefins having from 2 to 6 carbon atoms. The olefins are carbonylated to carbonyl products such as the aldehydes and alcohols produced by hydroformylation using carbon monoxide and hydrogen as the reactant. Examples of the products from this reaction include propionaldehyde, normal and iso- butyraldehyde and butanol, normal and isovalero aldehyde and alcohol, etc. When the coreactant is water, the corresponding carboxylic acids of the aldehydes are produced, e.g., propionoic acid and normal and iso butyric acid, pentanoic acid, hexanoic acid, etc. when the coreactant is an alcohol, the resulting products are the esters of the aforementioned acids.

Suitable alcohols that can be used as the coreactant include the lower molecular weight ($C_1$–$C_{10}$) alkyl and cycloalkyl alcohols, e.g., methanol, ethanol, propanol, isopropanol, butanol, isobutanol, pentanol, isopentanol, cyclopentanol, methylcyclopentanol, hexanol, isohexanol, cyclohexanol, ethylcyclohexanol, 2-ethylhexanol, decanol, isooctanol, 3-butylcyclohexanol, etc. The reaction produces the ester of the carboxylic acid resulting from the hydroformylation reaction, e.g., the reaction of ethylene, isopropanol and carbon monoxide results in the production of isopropyl acetate; the reaction of cyclohexanol, carbon monoxide and butene-1 results in the production of a mixture of the cyclohexyl esters of normal and iso valeric acid, etc.

The coreactant can also be a primary or secondary amine such as an alkyl or cycloalkyl amine having from 1 to about 10 carbons, e.g., methyl, ethyl, propyl, isopropyl, diisopropyl, butyl, dibutyl, isobutyl, amyl, methylisoamyl, isoamyl, hexyl, cyclohexyl, cyclopentyl, decyl, octyl, methylcyclopentyl, dicyclopentyl, butylcyclohexyl amines, etc. This reaction results in the production of an N-substituted or N,N-disubstituted amide of a carboxylic acid. Thus the carbonylation of ethylene with the amine coreactant results in the production of N-substituted propionamides and the reaction using propylene as the olefin results in the production of N-substituted butyramides; the reaction of ethylamine, carbon monoxide and butene-1 results in the production of N-ethyl valeramide; the reaction of diethylamine, carbon monoxide and ethylene produces N,N-diethyl propionamide, etc.

The catalyst for the carbonylation reactions performed in the vapor phase in accordance with my invention in general comprises a complex containing a Group VIII metal and a biphyllic ligand. The Group VIII metal can be complexed as the metal, hydride, salt or carbonyl with the biphyllic ligand. The Group VIII metal can be iron, nickel or cobalt or can be a noble metal such as the platinum subgroup consisting of platinum, osmium and iridium or the palladium subgroup consisting of rhodium, palladium and ruthenium. The metal catalyst can be impregnated on the carrier in any suitable form and examples of suitable sources of metal catalysts for the impregnation are as follows: bis(triphenylphosphine) iridium carbonyl chloride; tris(triphenylphosphine) iridium carbonyl hydride; iridium carbonyl; iridium tetrabromide; iridium tribromide; iridium trifluoride; iridium trichloride; osmium trichloride; chloroosmic acid, palladium hydride; palladous chloride, palladous cyanide, palladous iodide; bis(triphenylphosphine)palladous dichloride; bis(triphenylphosphine)palladium hydrochloride; palladous nitrate; platinic acid; platinous iodide; palladium cyanide; sodium hexachloroplatinate; potassium trichloro(ethylene)platinate(II); chloropentaaminorhodium(III) chloride; rhodium dicarbonyl chloride dimer; rhodium nitrate; rhodium trichloride; tris(triphenylphosphine)rhodium carbonyl hydride; tris(triphenylphosphine)rhodium(I)chloride; ruthenium trichloride; tetraamminorutheniumhydroxychloro chloride, etc. Suitable salts of other Group VIII metals include cobalt chloride, ferric acetate, nickel fluoride, cobalt nitrate; etc., carboxylates of $C_2$-$C_{10}$ acids, e.g., cobalt acetate, rhodium acetate, ferric butyrate, cobalt octoate, etc., cobalt carbonyl, iron carbonyl, nickel sulfate, ferric nitrate, etc.

The catalyst also comprises a biphyllic ligand. The biphyllic ligand is a compound having at least one atom with a pair of electrons capable of forming a coordinate covalent bond with a metal atom and simultaneously having an ability to accept an electron from the metal, thereby imparting additional stability to the resulting complex. Biphyllic ligands can comprise organic, hydrocarbaryl compounds having from 3 to about 24 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following formula:

or the following formula:

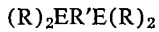

wherein E is a trivalent atom selected from the class consisting of phosphorus, arsenic, antimony and bismuth;

wherein R is a member of the class consisting of hydrogen, alkyl from 1 to 8 carbon atoms, aryl from 6 to 8 carbons and amino, halo and alkoxy substitution products thereof; and wherein R' is alkylene having from 1 to about 8 carbons.

Examples of suitable biphyllic ligands useful in my invention to stabilize the catalyst composition are the following: trimethylphosphine, triethylarsine, triethylbuismuthine, triisopropylstibine, chlorodiethylphosphine, triaminobutylarsine, ethyldiisopropylstibine, tricyclohexylphosphine, triphenylphosphine, triphenylbismuthine, tri(o-tolyl)phosphine, tri-(2-ethylhexyl)arsine, phenyldiisopropylphosphine, phenyldiamylphosphine, ethyldiphenylphosphine, chlorodixylylphosphine, chlorodiphenylphosphine, tris(diethylaminomethyl)phosphine, ethylene bis(diphenylphosphine), tritolylphosphine, tritolylstibine, hexamethylene bis(diisopropylarsine), pentamethylene bis(diethylstibine), diphenyl(N,N-dimethylanilinyl)phosphine, trianilinylphosphine, tri(3,5-diaminophenyl)phosphine, trianilinylarsine, anilinyldiphenylbismuthine, etc. Of the aforementioned, the arylphosphines are preferred with the Group VIII noble metals because of the demonstrated non-equivalent greater activity of these catalysts containing noble metals and arylphosphines, while the alkylphosphines are preferred for use with the Group VIII non-noble metals because of the greater activity of this combination with the non-noble metals.

The amount of biphyllic ligand in the catalyst can be varied from the stoichiometric equivalent in the complex to an excess amount comprising from 5 to about 35 weight percent of the final catalyst solid. The complexes generally have from 2 to 3 moles of ligand per atom of Group VIII metal. A preferred catalyst having excess ligand would have from 5 to about 25 weight percent of the ligand.

The catalyst, including the biphyllic ligand, can be impregnated on an inert solid support for use in the reaction or employed neat in the reaction zone. When the solid is impregnated or distended on an inert solid support, it can comprise from 0.1 to about 50 weight percent, preferably from 1 to about 15 weight percent of the total catalyst. Various inorganic and inert solids can be used as the support such as the hydrous metal oxides such as silica, alumina, titania, zirconia, etc., as well as mixtures thereof. In addition, other solids that can be employed include activated carbon, charcoal, graphite, as well as synthetic and naturally occurring aluminum silicates, e.g., clays such as montmorillonite, illite, kaolin, etc. Other natural and synthetic aluminum silicates include the zeolites which are characterized by a relative pore diameter from about 5 to 14 A. and a characteristic X-ray diffraction pattern. Examples of naturally occurring zeolites include mordenite, chabazite, gmelenite, faujasite, etc. The synthetic zeolites, partially dehydrated crystalline compositions of silica and alumina, also known as molecular sieves, are described along with the method for their preparation in Pat. Nos. 2,882,243 and 2,882,244, and any of these materials can also be employed as the inert solid support for the vanadium, vanadium oxide or salt thereof. Examples of suitable zeolites are the "X," "Y," "L" or "J" crystal types. The preceding illustration of various inert solids that can be used as the support is not intended to be unduly limiting of the solids which can be employed. In general any solid which is stable at the reaction temperatures and inert to the reactants, products or catalyst components at the reaction conditions can be employed.

The solid employed as the inert carrier can comprise particles having an average diameter of about ¼ " to particles sufficiently subdivided as to pass 325 mesh screen, e.g., about 37 microns average diameter. The particle size of the solids employed depends on the nature of the solid-gas contacting to be used. When a fluidized system is desired, i.e., when the solid is to be suspended in an upwardly ascending gas stream, the subdivided particles which pass a 20 mesh but are retained on a 400 mesh screen can be employed. When the solid-gas contacting is to be performed in a fixed bed with a stationary bed of catalyst, larger diameter particles are employed, including the solids having particle diameters from about 0.1 to about 0.3 inch. For fixed bed contacting, particles having diameters of about 1/32 to 1/4 inch can be employed.

The surface area of the inert solid can be widely varied from about 1 to about 1200 square meters per gram. The solids having high specific surface areas are preferred such as solids having surface areas from about 300 to about 1000 square meters per gram.

The active catalyst can be distended or supported on the inert solid carrier by any suitable means. The catalyst components, i.e., the metal, salt, hydride or carbonyl and the biphyllic ligand, or the catalyst complex, can simply be admixed with the hydrous metal oxide to prepare a physical solid mixture that can be extruded or formed into the desired catalyst pellets. The catalyst can also be impregnated on the inert solid support by soaking the solid in an aqueous or organic solution of any of the aforementioned catalyst components.

The complex can be preformed by admixture of the biphyllic ligand with a solution of the metal salt or carbonyl in a suitable solvent, e.g., water, aqueous ammoniacal solutions, polar organic solvents. Thereafter a reducing agent such as an alkali metal hydride, borohydride, dithionite is added to reduce the valence state of the metal and form the complex. Alternatively, hydrogen or carbon monoxide can be introduced as the reducing agent. A technique for preparation of the complexes is described in greater detail in Patent No. 3,102,899. Since the catalyst is used in a reducing environment, it is not necessary to preform the complex, but instead, the individual components can be applied by treatment of the solid with separate solutions of the metal salt, hydride or carbonyl and of the biphyllic ligand. The solid can thereafter be removed, dried, and then employed for the reaction where the reduction will be secured in situ. Drying conditions that can be used include treatment of the impregnated solid in an oven at temperatures from 90° to about 250° C. with or without an inert blanketing atmosphere such as nitrogen.

The reaction is performed by conducting a gas mixture of the aforementioned reactants including the olefin, carbon monoxide, coreactant over the catalyst at a gas hourly space velocity from about 500 to about 10,000; preferably from about 1000 to about 5000; and most preferably from about 2000 to about 4000 gas volumes per catalyst volume per hour. The reaction is performed at temperatures from about 30° to about 300° C.; preferably from about 75° to 225°; and most preferably from about 100° to about 175° C. The pressure that can be employed can be from about 1 to 1000 atmospheres; preferably from about 10 to about 100; and most preferably from about 15 to about 50 atmospheres. The relative ratios of carbon monoxide to the coreactant in the gas mixture can be widely varied from about 1:10 to about 10:1 parts by volume per part by volume of the coreactant; preferably the ratio is from about 3:7 to about 7:3; and most preferably is about 1:1 part per part of coreactant.

The concentration of olefin in the final gas mixture can be from about 5 to about 50 volume percent; preferably from about 10 to about 30 volume percent. The entire reactant gas stream can, if desired, be diluted with a suitable inert diluent gas to provide a final gas mixture having from about 0 to 90 volume percent of the inert diluent; preferably from about 15 to about 50 volume percent of such diluent. Examples of suitable diluents that can be used to moderate the reaction by reducing the concentration of the reactants and by providing a cooling or heating fluid for maintaining proper temperature conditions can be carbon dioxide, nitrogen or any suitably volatile inert hydrocarbon such as the low molecular weight alkanes, e.g., methane, ethane, propane, isopropane, pentane, isopentane, hexane, isohexane, octane, decane, etc.

The products of the carbonylation can be recovered by cooling the vapor effluent from the reactor sufficiently to effect condensation of the carbonyl products. The condensed liquid can be separated from the gas phase which can be recycled to further contacting together with fresh reactants while the condensate can be purified by subsequent distillative fractionation as apparent to those skilled in the art.

This invention will now be described by the following specific illustrations of reactions:

Example 1

The reaction was performed in a stainless steel, tubular reaction zone in which the reactant gas mixture was introduced into the top of the reaction zone which was positioned vertically above a product collection vessel immersed in a water-ice bath. The reactor was packed with 50 grams of silica pellets containing 6 weight percent alumina that had been impregnated with a solution containing 2.23 grams of tris(triphenylphosphine) rhodium hydride carbonyl and 10 grams of excess triphenylphosphine in benzene. The benzene had been evaporated from the mixture of the silica pellets in the impregnation solution and the resulting solid had been dried and packed in the reactor in admixture with 195 milliliters of quartz chips.

The reactor was heated to 287° F. and ethylene, carbon monoxide and hydrogen were admixed to provide a reactant gas mixture containing 20 percent ethylene and 40 percent each of carbon monoxide and hydrogen at 400 p.s.i.g. The reactant gas mixture was passed through the reaction zone at a reactant space velocity from 2000 to 4500 gas volumes per volume per hour. The products were collected from the reaction that was performed over a 4-hour period and analyzed by distillation to reveal that the rate of conversion was 74 percent based on the ethylene supply to the reaction zone and the product had the following composition: propionaldhyde, 98.64 weight percent; propanol, 1.14 weight percent; and 2-methylpentanol, 0.22 weight percent.

Substantially the same results are obtained when a catalyst comprising 5 weight percent of cobalt carbonyl tri-n-butylphosphine deposited on titania is used in place of the rhodium catalyst of the preceding example. Similar results are also obtained when a catalyst comprising 10 weight percent of tris(tritolylphosphine)iridium chloro carbonyl deposited on zirconia is used in place of the rhodium catalyst of the preceding example.

Example 2

The reaction was repeated with the rhodium catalyst described in Example 1 using a gas mixture comprising about 30 percent propylene and about equal molar quantities of carbon monoxide and hydrogen. The reaction was performed at 400 p.s.i.g. and a temperature of 224° F. and over a 20-minute reaction period a conversion rate of 10.5 percent based on the propylene was achieved and the following products were produced:

TABLE 1

| | Weight percent of condensed product |
|---|---|
| n-Butyraldehyde | 87.5 |
| Isobutyraldehyde | 5.1 |
| Other | 7.4 |

The gaseous effluent from the product collection vessel was sampled and the gas sample was analyzed by mass spectroscopy to obtain the following analysis:

| | |
|---|---|
| Propane | 0.12 |
| Propylene | 16.44 |
| $H_2$ | 41.85 |
| CO | 41.59 |

The reaction was repeated with propylene comprising about 16 volume percent of the reaction mixture containing an equal molar quantity of carbon monoxide and hydrogen. The reaction was performed at 280° F. and 400 p.s.i.g. over a reaction period of 1.2 hours and a conversion rate of 15.5 percent based on the propylene converted was achieved. The products collected from the reaction zone comprised the following:

TABLE 2

| | Weight percent of condensed product |
|---|---|
| Isobutyraldehyde | 11.6 |
| n-Butyraldehyde | 62.4 |
| Isobutanol | 0.5 |
| Normal butanol | 9.2 |
| Other | 14.2 |

When the reaction is repeated with butene-1, carbon monoxide and hydrogen, a favorable conversion to valeraldehydes is obtained.

When the reaction is repeated using water vapor as the coreactant rather than hydrogen, and over a silica-impregnated with 10 weight percent of bis(triphenylphosphine) palladium dichloride, a high yield of normal and isobutyric acid is obtained.

The invention has been illustrated with the preferred mode of practice, however, it is not intended that the specific illustration be construed as limiting of the invention which is intended to be defined by the following claims.

I claim:

1. The gas phase carbonylation of a hydrocarbon alpha monoolefin having from 2 to about 6 carbons which comprises contacting a gas mixture of said olefin, carbon monoxide and hydrogen in vapor phase with a solid catalyst comprising rhodium hydride carbonyl in complex association with phosphine biphyllic ligand of the formula: $PR_3$ wherein R is alkyl from 1 to 8 carbon atoms or aryl from 6 to 8 carbons and at least one of said R groups is aryl at a temperature from 30° to 300° C., a pressure from 1 to 1000 atmospheres and space velocity from 500 to about 10,000 atmospheres and space velocity from 500 to about 10,000 gas volumes per volume of catalyst per hour.

2. The carbonylation of claim 1 wherein said phosphine is a triarylphosphine.

3. The carbonylation of claim 1 wherein said catalyst is supported on an inert solid having a surface area from 1 to about 1200 square meters per gram.

4. The carbonylation of claim 1 wherein said catalyst has an average particle diameter from about 37 microns to about ¼ inch.

5. The carbonylation of claim 1 wherein said catalyst contains from 5 to about 35 weight percent of said phosphine biphyllic ligand.

6. The carbonylation of claim 2 wherein said catalyst is supported on silica.

7. The carbonylation of claim 3 wherein said biphyllic ligand is triphenylphosphine and said rhodium is impregnated on said solid support as $RhHCO(PR_3)_3$.

8. The carbonylation of claim 1 wherein said inert support is alumina.

References Cited

UNITED STATES PATENTS

| 3,487,112 | 12/1969 | Paulik et al. | 260—604 |
| 3,239,566 | 3/1966 | Slaugh et al. | 260—604 |
| 3,102,899 | 9/1963 | Cannell | 260—439 |

FOREIGN PATENTS

| 801,734 | 9/1958 | Great Britain | 260—604 |

OTHER REFERENCES

Gankin et al., Chem. Abstracts, vol. 64, 1966, col. 19264.

LEON ZITVER, Primary Examiner

R. H. LILES, Assistant Examiner

U.S. Cl. X.R.

260—497 R, 533 A, 598, 561 R 604 HF, 632 HF, 617 HF